US011063852B2

(12) United States Patent
Hallivuori et al.

(10) Patent No.: US 11,063,852 B2
(45) Date of Patent: Jul. 13, 2021

(54) METHOD AND A DEVICE FOR GENERATING REPORT DATA RELATED TO AN INTERFACE STATUS

(71) Applicant: Coriant Oy, Espoo (FI)

(72) Inventors: Ville Hallivuori, Espoo (FI); Mika Silvola, Kempele (FI); Mika Lindgren, Espoo (FI); Jarkko Väänänen, Helsinki (FI)

(73) Assignee: CORIANT OY, Espoo (FI)

( * ) Notice: Subject to any disclaimer, the term of this patent is extended or adjusted under 35 U.S.C. 154(b) by 200 days.

(21) Appl. No.: 16/113,372

(22) Filed: Aug. 27, 2018

(65) Prior Publication Data

US 2019/0097905 A1 Mar. 28, 2019

(30) Foreign Application Priority Data

Sep. 26, 2017 (EP) .................................... 17193147

(51) Int. Cl.
*H04L 12/26* (2006.01)
*H04L 12/703* (2013.01)

(52) U.S. Cl.
CPC .......... *H04L 43/067* (2013.01); *H04L 43/028* (2013.01); *H04L 43/065* (2013.01);
(Continued)

(58) Field of Classification Search
CPC ..... H04L 43/06; H04L 43/028; H04L 43/065; H04L 43/081; H04L 43/0852; H04L 43/067; H04L 43/0817
See application file for complete search history.

(56) References Cited

U.S. PATENT DOCUMENTS 7,580,418 B2 8/2009 Suzuki et al.
8,422,358 B2 4/2013 Bauchot et al.
(Continued)

OTHER PUBLICATIONS

Wilton R. et al.: "Common Interface Extension YANG Data Models: draftietf-netmod-intf-ext-yang-05.txt", Common Interface Extension YANG Data Models; Internet Engineering Task Force, Internet Enfineering Task Force, IETF; Standardworkingdraft, Internet Society (ISOC) 4, Rue Des Falaises CH-1205 GE No. 5, Jul. 4, 2017, pp. 1-27, XP015120895, [retrieved on Jul. 4, 2017] abstract.
(Continued)

*Primary Examiner* — Christopher B Robinson (57) ABSTRACT

Disclosed is a method and a device for generating report data related to a status of an interface of a network element are presented. The method includes: activating a delay timer when the interface status changes, setting delay-based data to express the interface status at the end of a delay determined by the delay-timer, setting dampening-based data to express the interface status if a penalty value fulfils a pre-determined condition and otherwise to express that the interface is non-utilizable, and setting the report data to express that the interface is utilizable if both the delay-based data and the dampening-based data express that the interface is utilizable. The penalty value is decreased with a dampening rule, and the penalty value is increased when the interface becomes non-utilizable and increasing the penalty value within a time-window is below a desired limit.

16 Claims, 3 Drawing Sheets

(52) U.S. Cl.
CPC ...... *H04L 43/0817* (2013.01); *H04L 43/0852* (2013.01); *H04L 45/28* (2013.01)

(56) References Cited

U.S. PATENT DOCUMENTS

| | | | | |
|---|---|---|---|---|
| 2012/0127850 | A1* | 5/2012 | Bauchot | H04L 43/062 370/216 |
| 2015/0222557 | A1* | 8/2015 | Bhattacharya | H04L 41/00 370/237 |
| 2016/0364267 | A1* | 12/2016 | Varadarajan | G06F 9/4881 |
| 2018/0006875 | A1* | 1/2018 | Floyd, III | H04L 41/0659 |

OTHER PUBLICATIONS

EP Search Report, dated Nov. 1, 2017, from corresponding EP 17193147 application.

* cited by examiner

METHOD AND A DEVICE FOR GENERATING REPORT DATA RELATED TO AN INTERFACE STATUS

FIELD OF THE DISCLOSURE

The disclosure relates generally to producing report data suitable for informing a control-plane and/or another entity about a status of an interface of a network element. More particularly, the disclosure relates to a method and to a device for generating report data related to a status of an interface of a network element. Furthermore, the disclosure relates to a computer program for generating report data related to a status of an interface of a network element. Furthermore, the disclosure relates to a network element such as e.g. a router.

BACKGROUND

In a data transfer network, there is often a need to communicate statuses of interfaces of a network element to a control plane which run e.g. routing protocols. Furthermore, there can be a need to communicate the statuses of the interfaces to other physical and/or logical entities which run e.g. protection and/or other functionalities dependent on the statuses of the interfaces. The network element can be for example an Internet Protocol "IP" router, a MultiProtocol Label Switching "MPLS" router "LSR", a packet optical switch, an Ethernet switch, and/or a software-defined networking "SDN" controlled network element. Typically, it would be however disadvantageous to communicate the status of an interface as such because the status can flap frequently between an on-state where the interface is utilizable and an off-state where the interface is not utilizable. For example, the packet optical convergence leads in many cases to situations where there is a packet optical network on a route between two network elements. When the packet optical network carries out e.g. re-routing, this causes that each of the above-mentioned network elements sees that an interface connected to a link providing an access to the other network element has a temporally isolated burst of status changes between the on-state and the off-state. For example, the control plane would be heavily loaded if it were forced to react to all these status changes.

Thus, there is a need to generate report data for communicating the status of an interface to the control plane and/or to other appropriate entities so that status flapping is filtered out from the report data but it still provides sufficient information about the status of the interface.

Carrier delay and interface flap dampening are two commonly known methods for generating report data that informs the control-plane and/or other appropriate entities about a status of an interface of a network element. The carrier delay is based on a delay timer which is activated when the status of the interface changes and the delay timer is inactive. The above-mentioned report data is set to express the status of the interface prevailing at the end of a delay determined by the delay-timer. Thus, status flapping occurring during the delay is filtered out from the report data. A general problem of the carrier delay is that its delay timer may be in synchronism with repeating on-off status changes so that it erroneously expresses the on-state even if there are the repeating on-off status changes and thereby the interface is not utilizable. The interface flap dampening is based on penalty accumulation with a decay mechanism to keep the report data indicative of the off-state when a status of an interface flaps frequently. A problem of the interface flap dampening is that the penalty may reach a high value during a temporally isolated burst of on-off status changes and, after the burst, it may take a long time for the decay mechanism to decrease the penalty so much that the report data gets indicative of the on-state. Thus, the interface flap dampening may express the off-state for a too long time after the burst. Straightforward parallel and series connections of the interface flap dampening and the carrier delay do not solve the above-mentioned problems. For example, in a case of a parallel connection with the AND-logic, the interface flap dampening reports the off-state for a too long time after a burst of on-off status changes and thereby the result of the AND-logic also reports the off-state for the too long time after the above-mentioned burst.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments of the invention.

In accordance with the invention, there is provided a new device for generating report data related to a status of an interface of a network element, the report data being suitable for informing a control plane about the status of the interface so that flapping between utilizable and non-utilizable states of the interface is filtered out from the report data. A device according to the invention comprises a delay timer and a processor system configured to:

receive status data having an on-value when the interface is utilizable and an off-value when the interface is non-utilizable, initialize, in response to a situation which the status data is received for a first time, delay-based data to have a value of the status data and dampening-based data to have the value of the status data, activate the delay timer in response to a situation in which the status data changes while the delay timer is inactive, set, at an end of a delay determined by the delay timer, the delay-based data to have a value of the status data occurring at the end of the delay, set, regardless of the delay timer, the dampening-based data to have the value of the status data if a penalty value fulfils a condition defined with one or more penalty thresholds, and otherwise set the dampening-based data to have the off-value, and set, regardless of the delay timer, the report data to have a value of the delay-based data if the dampening-based data has the on-value, and otherwise set the report data to have the off-value.

In order to manage the above-mentioned penalty value, the processor system is configured to:

set, regardless of the delay timer, penalty control data to have a preventive value in response to a situation in which increasing the penalty value during a time window exceeds a predetermined limit, the time-window including the current moment of time and having a pre-determined temporal length, increase, regardless of the delay timer, the penalty value in response to a situation in which i) the status data changes from the on-value to the off-value and ii) the penalty control data has a value other than the preventive value, and decrease, regardless of the delay timer and in response to a situation in which the penalty value is greater than zero, the penalty value in accordance with a predetermined rule over time.

As the penalty value is allowed to be increased only when the increasing during the time window does not exceed the predetermined limit, the increase rate of the penalty value is limited. This limits the increase of the penalty value during for example a temporally isolated burst of on-off status changes. Therefore, the above-described device can be tuned by selecting appropriate values for the limit related to increasing the penalty value, for the decrease rate of the penalty value, and for the temporal length of the time-window so that the device does not report the off-state for a too long time after the burst. The increasing the penalty value can be measured in many ways. For example, an amount added to the penalty value during a time window can be used as a quantity indicative of the increasing the penalty value. For another example, the number of times the penalty value has been increased during a time window can be used as a quantity indicative of the increasing the penalty value.

In this document, the "increase the penalty value" means increasing the absolute value of a difference between the penalty value and a fixed bottom value, e.g. zero, of the penalty value. Correspondingly, the "decrease the penalty value" means decreasing the absolute value of the difference between the penalty value and the fixed bottom value. It is a question of interpretation whether e.g. a voltage signal having a given polarity or a digital signal having a given bit vector is deemed to be negative or positive. Thus, the above-presented definition for a device according to the invention covers analog implementations irrespective of polarity and a bottom value of an analog signal corresponding to the penalty value as well as digital implementations irrespective of a method for encoding the penalty value into a bit vector. For the sake of clarity and brevity, the penalty value is handled in this document as a non-negative number whose fixed bottom value is zero irrespective of the implementation of a device according to the invention.

In accordance with the invention, there is provided also a new network element that can be for example an Internet Protocol "IF" router, a multiprotocol label switching "MPLS" router "LSR", a packet optical switch, an Ethernet switch, and/or a software-defined networking "SDN" controlled network element. The network element comprises:
  interfaces for connecting to a data transfer network,
  a processing system for running a control plane for configuring the network element to operate as a part of the data transfer network and for running a data plane for forwarding data, and
  a device according to the invention for generating report data so as to inform at least the control plane about a status of at least one of the interfaces of the network element.

In accordance with the invention, there is provided also a new method for generating report data related to a status of an interface of a network element, the report data being suitable for informing a control plane about the status of the interface so that flapping between utilizable and non-utilizable states of the interface is filtered out from the report data. A method according to the invention comprises:
  receiving status data having an on-value when the interface is utilizable and an off-value when the interface is non-utilizable,
  initializing, in response to a situation which the status data is received for a first time, delay-based data to have a value of the status data and dampening-based data to have the value of the status data,
  activating a delay timer in response to a situation in which the status data changes while the delay timer is inactive,
  setting, at an end of a delay determined by the delay timer, the delay-based data to have a value of the status data occurring at the end of the delay,
  setting, regardless of the delay timer, the dampening-based data to have the value of the status data if a penalty value fulfils a condition defined with one or more penalty thresholds, and otherwise setting the dampening-based data to have the off-value, and
  setting, regardless of the delay timer, the report data to have a value of the delay-based data if the dampening-based data has the on-value, and otherwise setting the report data to have the off-value.

In order to manage the above-mentioned penalty value, the method comprises:
  setting, regardless of the delay timer, penalty control data to have a preventive value in response to a situation in which increasing the penalty value during a time window exceeds a predetermined limit, the time-window including the current moment of time and having a pre-determined temporal length,
  increasing, regardless of the delay timer, the penalty value in response to a situation in which i) the status data changes from the on-value to the off-value and ii) the penalty control data has a value other than the preventive value, and
  decreasing, regardless of the delay timer and in response to a situation in which the penalty value is greater than zero, the penalty value in accordance with a predetermined rule over time.

In accordance with the invention, there is provided also a new computer program for generating report data related to a status of an interface of a network element, the report data being suitable for informing a control plane about the status of the interface so that flapping between utilizable and non-utilizable states of the interface is filtered out from the report data. A computer program according to the invention comprises computer executable instructions for controlling a programmable processor to:
  receive status data having an on-value when the interface is utilizable and an off-value when the interface is non-utilizable,
  initialize, in response to a situation which the status data is received for a first time, delay-based data to have a value of the status data and dampening-based data to have the value of the status data,
  activate a delay timer in response to a situation in which the status data changes while the delay timer is inactive,
  set, at an end of a delay determined by the delay timer, the delay-based data to have a value of the status data occurring at the end of the delay,
  set, regardless of the delay timer, the dampening-based data to have the value of the status data if a penalty value fulfils a condition defined with one or more penalty thresholds, and otherwise set the dampening-based data to have the off-value, and
  set, regardless of the delay timer, the report data to have a value of the delay-based data if the dampening-based data has the on-value, and otherwise set the report data to have the off-value.

In order to manage the above-mentioned penalty value, the computer program comprises computer executable instructions for controlling the programmable processor to:

set, regardless of the delay timer, penalty control data to have a preventive value in response to a situation in which increasing the penalty value during a time window exceeds a predetermined limit, the time-window including the current moment of time and having a pre-determined temporal length, increase, regardless of the delay timer, the penalty value in response to a situation in which i) the status data changes from the on-value to the off-value and ii) the penalty control data has a value other than the preventive value, and decrease, regardless of the delay timer and in response to a situation in which the penalty value is greater than zero, the penalty value in accordance with a predetermined rule over time.

In accordance with the invention, there is provided also a new non-transitory computer readable medium, e.g. a compact disc "CD". A non-transitory computer readable medium according to the invention is encoded with a computer program according to the invention.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of also un-recited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description below are not exhaustive unless otherwise explicitly stated.

Figure 1:
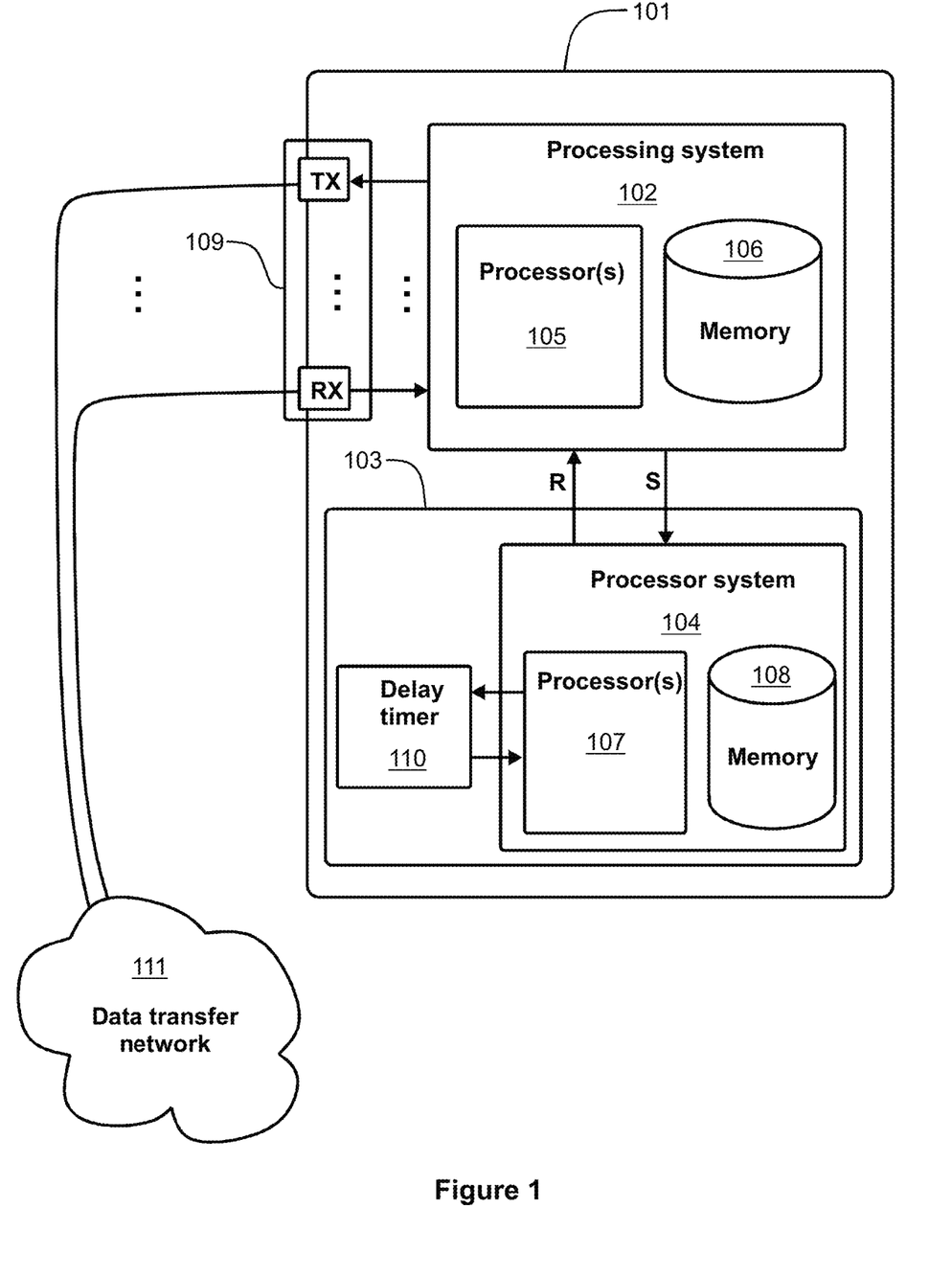
FIG. 1 shows a schematic illustration of a network element according to an exemplifying and non-limiting embodiment of the invention.

FIG. 1 shows a schematic illustration of a network element 101 according to an exemplifying and non-limiting embodiment of the invention. The network element 101 can be for example an Internet Protocol "IP" router, a multiprotocol label switching "MPLS" switch, a packet optical switch, an Ethernet switch, and/or a software-defined networking "SDN" controlled network element. The network element 101 comprises interfaces 109 for receiving data from a data transfer network 111 and for transmitting data to the data transfer network 111. The network element 101 comprises a processing system 102 for running control plane functionalities for configuring the network element 101 to operate together with the data transfer network 111 and for running data plane functionalities for forwarding data. The control plane runs e.g. routing protocols which are dependent on statuses of the interfaces 109. For example, there can be a need for re-routing if the status of a given interface changes from the on-state in which the interface is operable for data transfer to the off-state in which the interface is no more operable for data transfer. Furthermore, the processing system 102 can be configured to run protection and/or other functionalities which are dependent on the statuses of the interfaces 109.

The network element 101 comprises a device 103 according to an exemplifying and non-limiting embodiment of the invention for generating report data R based on the statuses of the interfaces 109 and for communicating the report data R to the control plane and to possible other entities which are implemented with the processing system 102 and which are dependent on the statuses of the interfaces 109. The device 103 comprises a processor system 104 and a delay timer 110. In FIG. 1, the processor system 104 and the delay timer 110 are presented as separate entities but in a practical implementation the delay timer can be implemented with the processor system 104. Furthermore, it is also possible that the processing system 102 and the processor system 104 are implemented with same hardware elements. In this exemplifying case, the processing system 102, the processor system 104, and the delay timer 110 are mere logical entities.

The processor system 104 of the device 103 is configured to receive, for each interface, status data S having an on-value when the interface under consideration is utilizable and an off-value when the interface is non-utilizable. The processor system 104 is configured to activate the delay timer 110 in response to a situation in which the status data S changes while the delay timer 110 is inactive. The processor system 104 is configured to wait for a delay determined by the delay timer and then set, at the end of the delay, delay-based data DE to have the value of the status data S occurring at the end of the delay. Thus, possible flapping of the status data S during the delay is filtered out from the delay-based data DE. The processor system 104 is configured to set dampening-based data DM to have the value of the status data S if a penalty value P fulfils a condition defined with one or more penalty thresholds, and otherwise to set the dampening-based data DM to have the off-value. Examples of the condition defined with the one or more penalty thresholds are presented later in this document. The processor system 104 is configured to set the report data R to have the value of the delay-based data DE if the dampening-based data DM has the on-value, and otherwise to set the report data R to have the off-value.

In order to manage the above-mentioned penalty value P, the processor system 104 is configured to carry out the following actions: a) setting penalty control data PC to have a preventive value if an amount exceeding an increase limit has been added to the penalty value P during a time-window including the current moment of time and having a pre-determined temporal length, b) increasing the penalty value with a penalty increment ΔP in response to a situation in which the status data S changes from the on-value to the off-value and the penalty control data PC has a value other than the preventive value, and c) decreasing the penalty value P in accordance with a predetermined rule over time. As the amount allowed to be added to the penalty value P within the time-window is limited, the increase rate of the penalty value P is limited. This limits the increase of the penalty value P during for example a temporally isolated burst of on-off changes in the status data S. The above-mentioned predetermined rule for decreasing the penalty value P can be for example such that the penalty value P is multiplied the with a coefficient α less than one at successive moments of time, i.e. $P_{i+1} = \alpha P_i$, where $P_i$ is the penalty value when time=$t_i$ and $P_{i+1}$ is the penalty value when time=$t_{i+1}=t_i+\Delta t$, where $\Delta t$ is a time increment.

In a device according to an exemplifying and non-limiting embodiment of the invention, the processor system 104 is configured to set the penalty control data PC to have the preventive value if the penalty value P has been increased a pre-determined number of times during the time-window. The pre-determined number can be for example but not necessarily 1, 2, or 3.

In a device according to an exemplifying and non-limiting embodiment of the invention, the processor system 104 is configured to begin a new time-window at each time when a change of the status data S from the on-value to the off-value causes an activation of the delay timer 110. The temporal length of the time-window is advantageously the temporal length of the delay determined by the delay timer. The above-mentioned change of the status data S can be deemed to belong to the time-window which is started due to the change of the status data S. In this exemplifying case, the processor system 104 increases the penalty value P at the beginning of the time-window. The increase of the penalty value carried out at the beginning of the time-window represents at least a part of the amount being added to the penalty value during the started time-window.

In a device according to an exemplifying and non-limiting embodiment of the invention, the processor system 104 is configured to begin a new time-window at each time when a change of the status data S from the off-value to the on-value causes an activation of the delay timer 101. The temporal length of the time-window is advantageously the temporal length of the delay determined by the delay timer.

In a device according to an exemplifying and non-limiting embodiment of the invention, the processor system 104 is configured to begin a new time-window at each time when a change of the status data S from the on-value to the off-value or from the off-value to the on-value causes an activation of the delay timer 101. The temporal length of the time-window is advantageously the temporal length of the delay determined by the delay timer.

In a device according to an exemplifying and non-limiting embodiment of the invention, the processor system 104 is configured to set the time-window to be a sliding time-window so that the current moment of time is the end-point of the sliding time-window and the time-window slides forward along time. In this exemplifying case, the processor system 104 is configured to check whether or not an amount added to the penalty value P during a time interval from t-TW to t exceeds the increase limit, where t is the current moment of time and TW is the temporal length of the time-window.

In a device according to an exemplifying and non-limiting embodiment of the invention, the processor system 104 is configured to set the time-window to be a step-wise proceeding time-window so that the time-window is shifted step-wise forward by the temporal length TW of the time-window when the current moment of time reaches the end-point of the time-window. In this exemplifying case, the processor system 104 is configured to check whether or not an amount added to the penalty value P during a time interval from $t-TW_{elapsed}$ to t exceeds the increase limit, where t is the current moment of time, and $TW_{elapsed}$ is the temporal length of the elapsed part of the current time-window.

In a device according to an exemplifying and non-limiting embodiment of the invention, the processor system 104 is configured to set the dampening-based data DM to have the value of the status data S if the penalty value P is less than a penalty threshold $P_{th}$, and otherwise to set the dampening-based data DM to have the off-value.

In a device according to another exemplifying and non-limiting embodiment of the invention, the processor system 104 is configured to set the dampening-based data DM to have the value of the status data S if one of the following conditions a) and b) is fulfilled, and otherwise to set the dampening-based data to have the off-value:

a) the penalty value P is less than a lower penalty threshold $P_{thL}$, or
b) the penalty value P is at least the lower penalty threshold $P_{thL}$ and less than a higher penalty threshold $P_{thH} > P_{thL}$, and the penalty value P has not reached the higher penalty threshold $P_{thH}$ after a most recent time when the penalty value P was less than the lower penalty threshold $P_{thL}$.

An advantage of the above-described approach based on the two penalty thresholds $P_{thL}$ and $P_{thH}$ is that a situation where the penalty value P oscillates around one of the thresholds does make the dampening-based data DM to oscillate between the off-value and the on-value when the status data S happens to have the on-value.

The processing system 102 of the network element 101 comprises one or more processors 105 each of which can be for example a programmable processor provided with appropriate software, a dedicated hardware processor such as for example an application specific integrated circuit "ASIC", or a configurable hardware processor such as for example a field programmable gate array "FPGA". The processing system 102 may comprise one or more memory circuits 106 each of which can be e.g. a random-access memory circuit "RAM" or a content-access memory circuit "CAM". The processor system 104 may comprise one or more processors 107, each of which can be a programmable processor provided with appropriate software, a dedicated hardware processor such as for example an application specific integrated circuit "ASIC", or a configurable hardware processor such as for example a field programmable gate array "FPGA". The processor system 104 may comprise one or more memory circuits 108 each of which can be e.g. a random-access memory circuit "RAM". It is also possible that the processing system 102 and the processor system 104 are implemented with same hardware elements.

Figure 2:
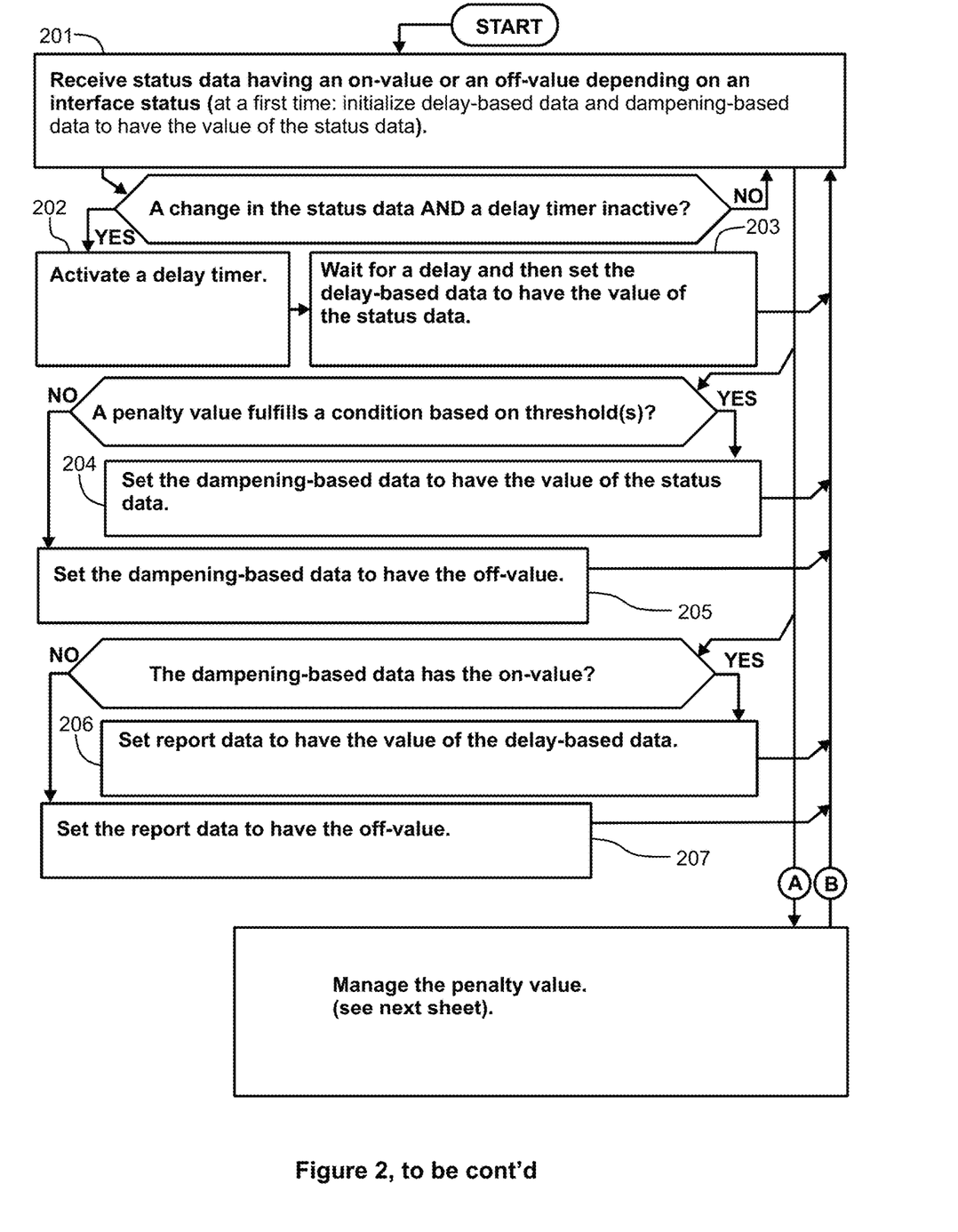
FIG. 2 shows a flowchart of a method according to an exemplifying and non-limiting embodiment of the invention for generating report data related to a status of an interface of a network element.

FIG. 2 shows a flowchart of a method according to an exemplifying and non-limiting embodiment of the invention for generating report data related to a status of an interface of a network element. A method according to the invention comprises the following actions:

action 201: receiving status data having an on-value when the interface is utilizable and an off-value when the interface is non-utilizable,
action 202: activating a delay timer in response to a situation in which the status data changes while the delay timer is inactive, action 203: setting, at an end of a delay determined by the delay timer, delay-based data to have a value of the status data occurring at the end of the delay, action 204: setting dampening-based data to have the value of the status data if a penalty value fulfils a condition defined with one or more penalty thresholds, and otherwise action 205: setting the dampening-based data to have the off-value, and action 206: setting the report data to have a value of the delay-based data if the dampening-based data has the on-value, and otherwise action 207: setting the report data to have the off-value.

In order to manage the above-mentioned penalty value, the method comprises the following actions:

action 208: setting penalty control data to have a preventive value in response to a situation in which increasing the penalty value during a time window exceeds a predetermined limit, the time-window including the current moment of time and having a pre-determined temporal length, action 209: increasing the penalty value in response to a situation in which i) the status data changes from the on-value to the off-value and ii) the penalty control data has a value other than the preventive value, and action 210: decreasing the penalty value in accordance with a predetermined rule over time.

A method according to an exemplifying and non-limiting embodiment of the invention comprises setting the penalty control data to have the preventive value if the penalty value has been increased a pre-determined number of times during the time-window. The pre-determined number can be e.g. 1, 2, or 3.

In a method according to an exemplifying and non-limiting embodiment of the invention, a change of the status data from the on-value to the off-value and causing an activation of the delay timer corresponds to a beginning of a new time-window whose temporal length is the temporal length of the delay. The penalty value can be increased at the beginning of the time-window. In this exemplifying case, the increase of the penalty value carried out at the beginning of the time-window represents at least a part of the amount being added to the penalty value during the time-window.

In a method according to an exemplifying and non-limiting embodiment of the invention, a change of the status data from the off-value to the on-value and causing an activation of the delay timer corresponds to a beginning of a new time-window whose temporal length is a temporal length of the delay.

In a method according to an exemplifying and non-limiting embodiment of the invention, the time-window is a sliding time-window so that the current moment of time is the end-point of the sliding time-window.

In a method according to an exemplifying and non-limiting embodiment of the invention, the time-window is a step-wise proceeding time-window so that the time-window is shifted step-wise forward by the temporal length of the time-window when the current moment of time reaches the end-point of the time-window.

A method according to an exemplifying and non-limiting embodiment of the invention comprises multiplying the penalty value with a coefficient less than one at successive moments of time so as to decrease the penalty value.

A method according to an exemplifying and non-limiting embodiment of the invention comprises setting the dampening-based data to have the value of the status data if the penalty value is less than a penalty threshold, and otherwise setting the dampening-based data to have the off-value.

A method according to an exemplifying and non-limiting embodiment of the invention comprises setting the dampening-based data to have the value of the status data if one of the following conditions a) and b) is fulfilled, and otherwise setting the dampening-based data to have the off-value:

a) the penalty value is less than a lower penalty threshold, or b) the penalty value is at least the lower penalty threshold and less than a higher penalty threshold and the penalty value has not reached the higher penalty threshold after a most recent time when the penalty value was less than the lower penalty threshold.

A computer program according to an exemplifying and non-limiting embodiment of the invention comprises computer executable instructions for controlling a programmable processor to carry out actions related to a method according to any of the above-described exemplifying embodiments of the invention.

A computer program according to an exemplifying and non-limiting embodiment of the invention comprises software modules for generating report data related to a status of an interface of a network element. The software modules comprise computer executable instructions for controlling a programmable processor to:

receive status data having an on-value when the interface is utilizable and an off-value when the interface is non-utilizable, activate a delay timer in response to a situation in which the status data changes while the delay timer is inactive, set, at an end of a delay determined by the delay timer, delay-based data to have a value of the status data occurring at the end of the delay, set dampening-based data to have the value of the status data if a penalty value fulfils a condition defined with one or more penalty thresholds, and otherwise set the dampening-based data to have the off-value, and set the report data to have a value of the delay-based data if the dampening-based data has the on-value, and otherwise set the report data to have the off-value.

In order to manage the above-mentioned penalty value, the software modules comprise computer executable instructions for controlling the programmable processor to:

set penalty control data to have a preventive value in response to a situation in which increasing the penalty value during a time window exceeds a predetermined limit, the time-window including the current moment of time and having a pre-determined temporal length, increase the penalty value in response to a situation in which i) the status data changes from the on-value to the off-value and ii) the penalty control data has a value other than the preventive value, and decrease the penalty value in accordance with a predetermined rule over time.

The above-mentioned software modules can be e.g. subroutines or functions implemented with a suitable programming language and with a compiler suitable for the programming language and the programmable processor under consideration. It is worth noting that also a source code corresponding to a suitable programming language represents the computer executable software modules because the source code contains the information needed for controlling the programmable processing system to carry out the above-presented modification actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an embodiment of invention.

A signal according to an exemplifying and non-limiting embodiment of the invention is encoded to carry information defining a computer program according to an embodiment of invention. In this exemplifying case, the computer program can be downloadable from a server that may constitute e.g. a part of a cloud service.

The specific examples provided in the description given above should not be construed as limiting the scope and/or the applicability of the appended claims. Lists and groups of examples provided in the description given above are not exhaustive unless otherwise explicitly stated.

What is claimed is:

1. A device for generating report data related to a status of an interface of a network element, the report data being suitable for informing a control plane about the status of the interface so that flapping between utilizable and non-utilizable states of the interface is filtered out from the report data, the device comprising a delay timer and a processor system configured to:
   receive status data having an on-value when the interface is utilizable and an off-value when the interface is non-utilizable,
   initialize, in response to a situation which the status data is received for a first time, delay-based data to have an initial value of the status data and dampening-based data to have the initial value of the status data,
   activate the delay timer in response to a situation in which the status data changes while the delay timer is inactive,
   set, at an end of a delay determined by the delay timer, the delay-based data to have a value of the status data occurring at the end of the delay,
   set, regardless of the delay timer, the dampening-based data to have a value of the status data if a penalty value fulfils a condition defined with one or more penalty thresholds, and otherwise set the dampening-based data to have the off-value,
   set, regardless of the delay timer, the report data to have a value of the delay-based data if the dampening-based data has the on-value, and otherwise set the report data to have the off-value,
   decrease, regardless of the delay timer and in response to a situation in which the penalty value is greater than zero, the penalty value in accordance with a predetermined rule over time,
   set, regardless of the delay timer, penalty control data to have a preventive value in response to a situation in which increasing the penalty value during a time window exceeds a predetermined limit, the time-window including a current moment of time and having a pre-determined temporal length, and
   increase, regardless of the delay timer, the penalty value in response to a situation in which both:
      the status data changes from the on-value to the off-value, and
      the penalty control data has a value other than the preventive value.

2. A device according to claim 1, wherein the processor system is configured to set the penalty control data to have the preventive value if an amount exceeding an increase limit has been added to the penalty value during the time-window.

3. A device according to claim 1, wherein the processor system is configured to set the penalty control data to have the preventive value if the penalty value has been increased a pre-determined number of times during the time-window.

4. A device according to claim 2, wherein the processor system is configured to set the penalty control data to have the preventive value if the penalty value has been increased a pre-determined number of times during the time-window.

5. A device according to claim 1, wherein a change of the status data from the on-value to the off-value and causing an activation of the delay timer corresponds to a beginning of a new time-window whose temporal length is a temporal length of the delay determined by the delay timer that was activated.

6. A device according to claim 5, wherein the processor system is configured to increase the penalty value at the beginning of the new time-window, the increase of the penalty value carried out at the beginning of the new time-window representing at least a part of an amount being added to the penalty value during the new time-window.

7. A device according to claim 1, wherein a change of the status data from the off-value to the on-value and causing an activation of the delay timer corresponds to a beginning of a new time-window whose temporal length is a temporal length of the delay.

8. A device according to claim 1, wherein the processor system is configured to set the time-window to be a sliding time-window so that the current moment of time is an end-point of the sliding time-window.

9. A device according to claim 1, wherein the processor system is configured to set the time-window to be a step-wise proceeding time-window so that the time-window is shifted step-wise forward by the temporal length of the time-window when the current moment of time reaches an end-point of the time-window.

10. A device according to claim 1, wherein the processor system is configured to multiply the penalty value with a coefficient less than one at successive moments of time so as to decrease the penalty value.

11. A device according to claim 1, wherein the processor system is configured to set the dampening-based data to have the value of the status data if the penalty value is less than a penalty threshold, and otherwise to set the dampening-based data to have the off-value.

12. A device according to claim 1, wherein the processor system is configured to set the dampening-based data to have the value of the status data if one of the following conditions a) and b) is fulfilled, and otherwise to set the dampening-based data to have the off-value:
   a) the penalty value is less than a lower penalty threshold, or
   b) the penalty value is at least the lower penalty threshold and less than a higher penalty threshold and the penalty value has not reached the higher penalty threshold after a most recent time when the penalty value was less than the lower penalty threshold.

13. A network element for a data transfer network, the network element comprising:
   interfaces for connecting to the data transfer network,
   a processing system for running a control plane for configuring the network element to operate as a part of the data transfer network and for running a data plane for forwarding data, and a device for generating report data so as to inform at least the control plane about a status of at least one of the interfaces of the network element, the report data being suitable for informing the control plane about the status of the at least one of the interfaces so that flapping between utilizable and non-utilizable states of the interface is filtered out from the report data, wherein the device comprises a delay timer and a processor system configured to:
  receive status data having an on-value when the interface is utilizable and an off-value when the interface is non-utilizable,
  initialize, in response to a situation which the status data is received for a first time, delay-based data to have an initial value of the status data and dampening-based data to have the initial value of the status data,
  activate the delay timer in response to a situation in which the status data changes while the delay timer is inactive,
  set, at an end of a delay determined by the delay timer, the delay-based data to have a value of the status data occurring at the end of the delay,
  set, regardless of the delay timer, the dampening-based data to have a value of the status data if a penalty value fulfils a condition defined with one or more penalty thresholds, and otherwise set the dampening-based data to have the off-value,
  set, regardless of the delay timer, the report data to have a value of the delay-based data if the dampening-based data has the on-value, and otherwise set the report data to have the off-value,
  decrease, regardless of the delay timer and in response to a situation in which the penalty value is greater than zero, the penalty value in accordance with a predetermined rule over time,
  set, regardless of the delay timer, penalty control data to have a preventive value in response to a situation in which increasing the penalty value during a time window exceeds a predetermined limit, the time-window including a current moment of time and having a pre-determined temporal length, and
  increase, regardless of the delay timer, the penalty value in response to a situation in which both:
    the status data changes from the on-value to the off-value, and
    the penalty control data has a value other than the preventive value.

14. A network element according to claim 13, wherein the network element is at least one of the following: an Internet Protocol IP router, a MultiProtocol Label Switching MPLS switch, a packet optical switch, an Ethernet switch, a software-defined networking "SDN" controlled network element.

15. A method for generating report data related to a status of an interface of a network element, the report data being suitable for informing a control plane about the status of the interface so that flapping between utilizable and non-utilizable states of the interface is filtered out from the report data, the method comprising:
  receiving status data having an on-value when the interface is utilizable and an off-value when the interface is non-utilizable,
  initializing, in response to a situation which the status data is received for a first time, delay-based data to have an initial value of the status data and dampening-based data to have the initial value of the status data,
  activating a delay timer in response to a situation in which the status data changes while the delay timer is inactive,
  setting, at an end of a delay determined by the delay timer, the delay-based data to have a value of the status data occurring at the end of the delay,
  setting, regardless of the delay timer, the dampening-based data to have a value of the status data if a penalty value fulfils a condition defined with one or more penalty thresholds, and otherwise setting the dampening-based data to have the off-value,
  setting, regardless of the delay timer, the report data to have a value of the delay-based data if the dampening-based data has the on-value, and otherwise setting the report data to have the off-value,
  decreasing, regardless of the delay timer and in response to a situation in which the penalty value is greater than zero, the penalty value in accordance with a predetermined rule over time,
  setting, regardless of the delay timer, penalty control data to have a preventive value in response to a situation in which increasing the penalty value during a time window exceeds a predetermined limit, the time-window including a current moment of time and having a pre-determined temporal length, and
  increasing, regardless of the delay timer, the penalty value in response to a situation in which both:
    the status data changes from the on-value to the off-value, and
    the penalty control data has a value other than the preventive value.

16. A non-transitory computer readable medium encoded with a computer program for generating report data related to a status of an interface of a network element, the report data being suitable for informing a control plane about the status of the interface so that flapping between utilizable and non-utilizable states of the interface is filtered out from the report data, the computer program comprising computer executable instructions for controlling a programmable processor to:
  receive status data having an on-value when the interface is utilizable and an off-value when the interface is non-utilizable,
  initialize, in response to a situation which the status data is received for a first time, delay-based data to have an initial value of the status data and dampening-based data to have the initial value of the status data,
  activate a delay timer in response to a situation in which the status data changes while the delay timer is inactive,
  set, at an end of a delay determined by the delay timer, the delay-based data to have a value of the status data occurring at the end of the delay,
  set, regardless of the delay timer, the dampening-based data to have a value of the status data if a penalty value fulfils a condition defined with one or more penalty thresholds, and otherwise set the dampening-based data to have the off-value,
  set, regardless of the delay timer, the report data to have a value of the delay-based data if the dampening-based data has the on-value, and otherwise set the report data to have the off-value,
  decrease, regardless of the delay timer and in response to a situation in which the penalty value is greater than zero, the penalty value in accordance with a predetermined rule over time,
  set, regardless of the delay timer, penalty control data to have a preventive value in response to a situation in which increasing the penalty value during a time window exceeds a predetermined limit, the time-window including a current moment of time and having a pre-determined temporal length, and increase, regardless of the delay timer, the penalty value in response to a situation in which both:
  the status data changes from the on-value to the off-value, and
  the penalty control data has a value other than the preventive value.

* * * * *